United States Patent [19]

Travis

[11] Patent Number: 4,671,385
[45] Date of Patent: Jun. 9, 1987

[54] INNER CABLE LUBRICATOR

[76] Inventor: Calvin C. Travis, 1735 Coleen, Memphis, Tenn. 38111

[21] Appl. No.: 805,566

[22] Filed: Dec. 6, 1985

[51] Int. Cl.⁴ .............................................. F16N 7/00
[52] U.S. Cl. .................................... 184/15.1; 74/502; 118/404; 427/434.7
[58] Field of Search ..................... 184/15.1, 16, 105.1, 184/105.2, 105.3; 118/307, 404, 405, 420; 427/434.7; 15/94, 97 R, 104 R; 74/502.4, 502.5, 502.6, 501 E

[56] References Cited

U.S. PATENT DOCUMENTS

| | | | |
|---|---|---|---|
| 2,083,937 | 6/1937 | Begg | 74/501 E |
| 2,681,711 | 6/1954 | Sievenpiper | 184/105.1 |
| 3,013,443 | 12/1961 | Morse | 74/501 E |
| 3,338,333 | 8/1967 | Wrasse | 184/105.1 |
| 3,884,329 | 5/1975 | Steffen | 184/15.1 |
| 4,066,147 | 1/1978 | Toyomoto | 184/15.1 |
| 4,415,064 | 11/1983 | Oliemuller | 184/105.1 |

FOREIGN PATENT DOCUMENTS 283293  1/1928  United Kingdom .............. 184/15.1

OTHER PUBLICATIONS

Marine Cable Lubricator Kit, Antonia Products, Inc. of Pollock, La. 71467.
Universal Cable Lubricator, Antonia Products, Inc. of Pollock, La. 71467.

Primary Examiner—Carlton R. Croyle
Assistant Examiner—Jane E. Obee
Attorney, Agent, or Firm—Walker & McKenzie

[57] ABSTRACT

A device for being attached to the distal end of a cable assembly including a tube and an inner cable extending coaxially through the tube. The device includes a body located adjacent the distal end of the tube for receiving the distal end of the inner cable, includes structure for attaching the distal end of the inner cable to the body, includes a seal located between the body and the distal end of the tube for sealing the body to the distal end of the tube when the distal end of the inner cable is attached to the body and force is applied to the inner cable to pull the body against the distal end of the tube, and includes a grease fitting attached to the body for allowing grease to be forced therethrough into the interior of the tube to lubricate the inner cable when the body is sealed relative to the distal end of the tube.

9 Claims, 6 Drawing Figures

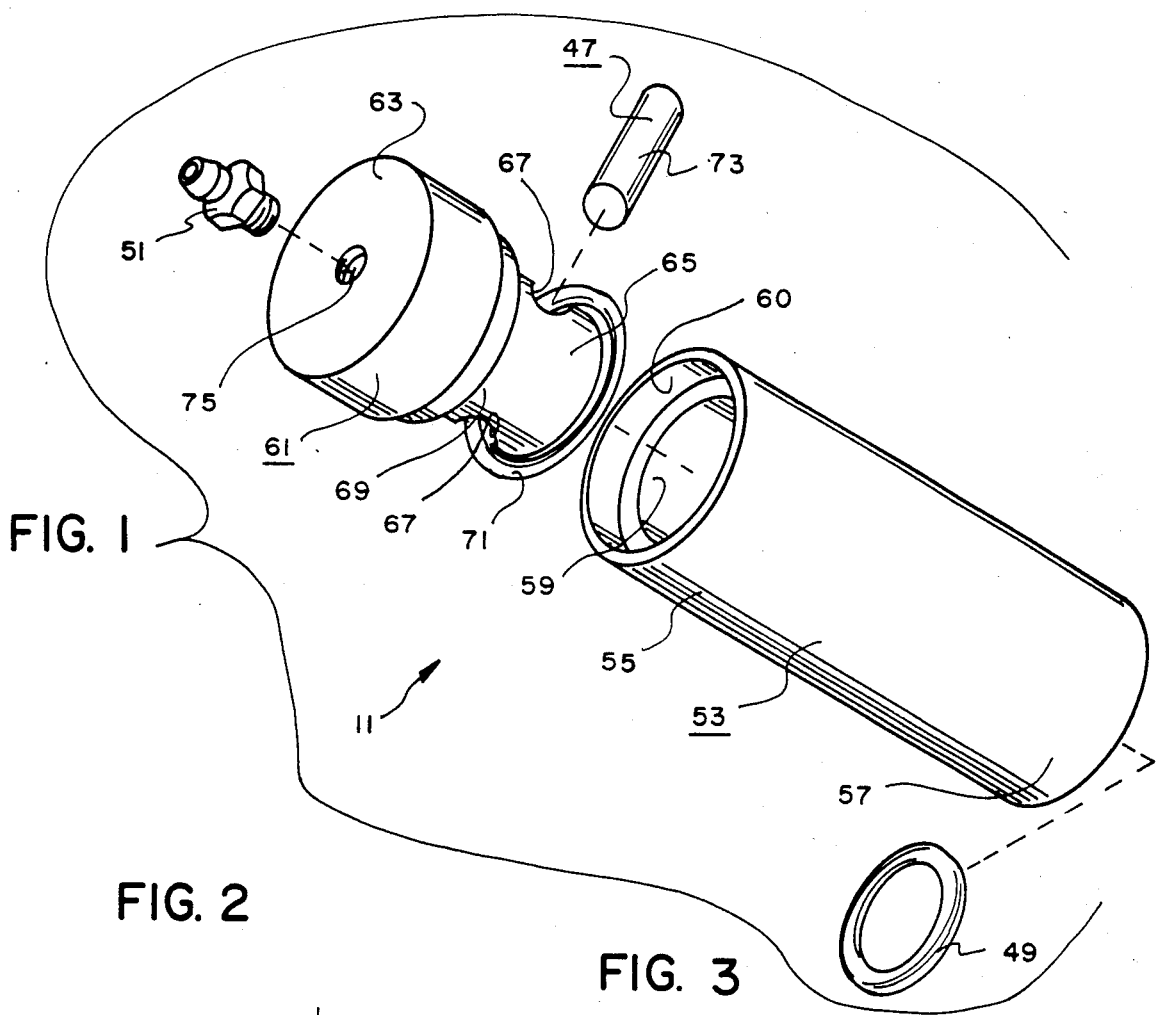
FIG. 1
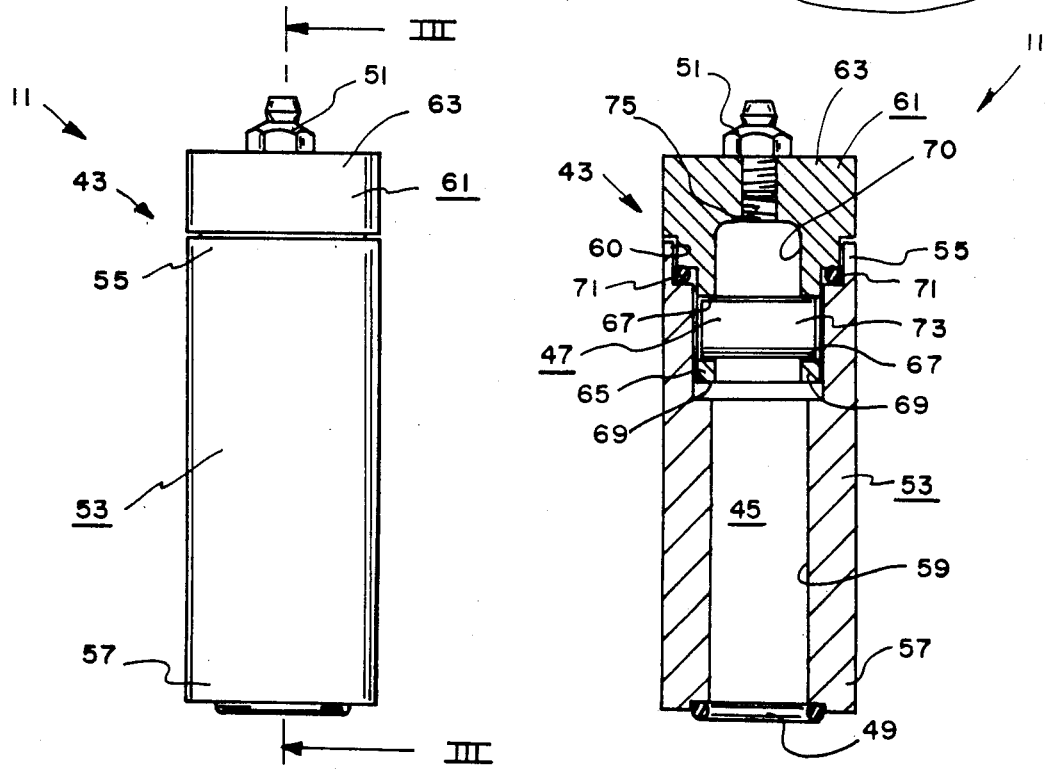
FIG. 2
FIG. 3

INNER CABLE LUBRICATOR

BACKGROUND OF THE INVENTION

1. Field of the Invention

The present invention relates, in general, to means for use in lubricating cable means which extend coaxially through a tube or the like.

2. Description of the Prior Art

The typical manner of lubricating a cable member of the type that extends coaxially through a tube or sheath is to completely remove the cable member from the tube or sheath, manually apply grease or other lubricant to the exterior of the cable member, and then reinsert the cable member into the tube or sheath.

SUMMARY OF THE INVENTION

The present invention is directed toward providing an improved means for lubricating a cable means which extends coaxially through a tube or sheath. The concept of the present invention is to attach a body means to the distal end of an inner cable and create a fluid-tight seal between the body means and the distal end of a tube or sheath through which the inner cable extends by applying a force to the inner cable to pull the body means against the distal end of the tube or sheath.

The device of the present invention includes, in general, a body means located adjacent a first end of a tube through which a cable means coaxially extends, the body means having a cavity for receiving the first end of the cable means; attachment means coupled to the body means for attaching the first end of the cable means to the body means; seal means located between the first end of the tube and the body means about the cavity of the body means for providing a seal between the first end of the tube and the body means about the cavity of the body means when a force is applied to the cable means to pull the body means against the first end of the tube; and grease fitting means attached to the body means in communication with the cavity of the body means for allowing grease to be forced therethrough into the cavity of the body means and into the interior of the tube to lubricate the cable means when a seal is provided between the first end of the tube and the body means about the cavity of the body means.

BRIEF DESCRIPTION OF THE DRAWINGS

FIG. 1 is an exploded perspective view of the inner cable lubricator device of the present invention.

FIG. 2 is an elevational view of the inner cable lubricator device of the present invention.

FIG. 3 is a sectional view as taken on line III—III of FIG. 2.

DESCRIPTION OF THE PREFERRED EMBODIMENT

Figure 4:
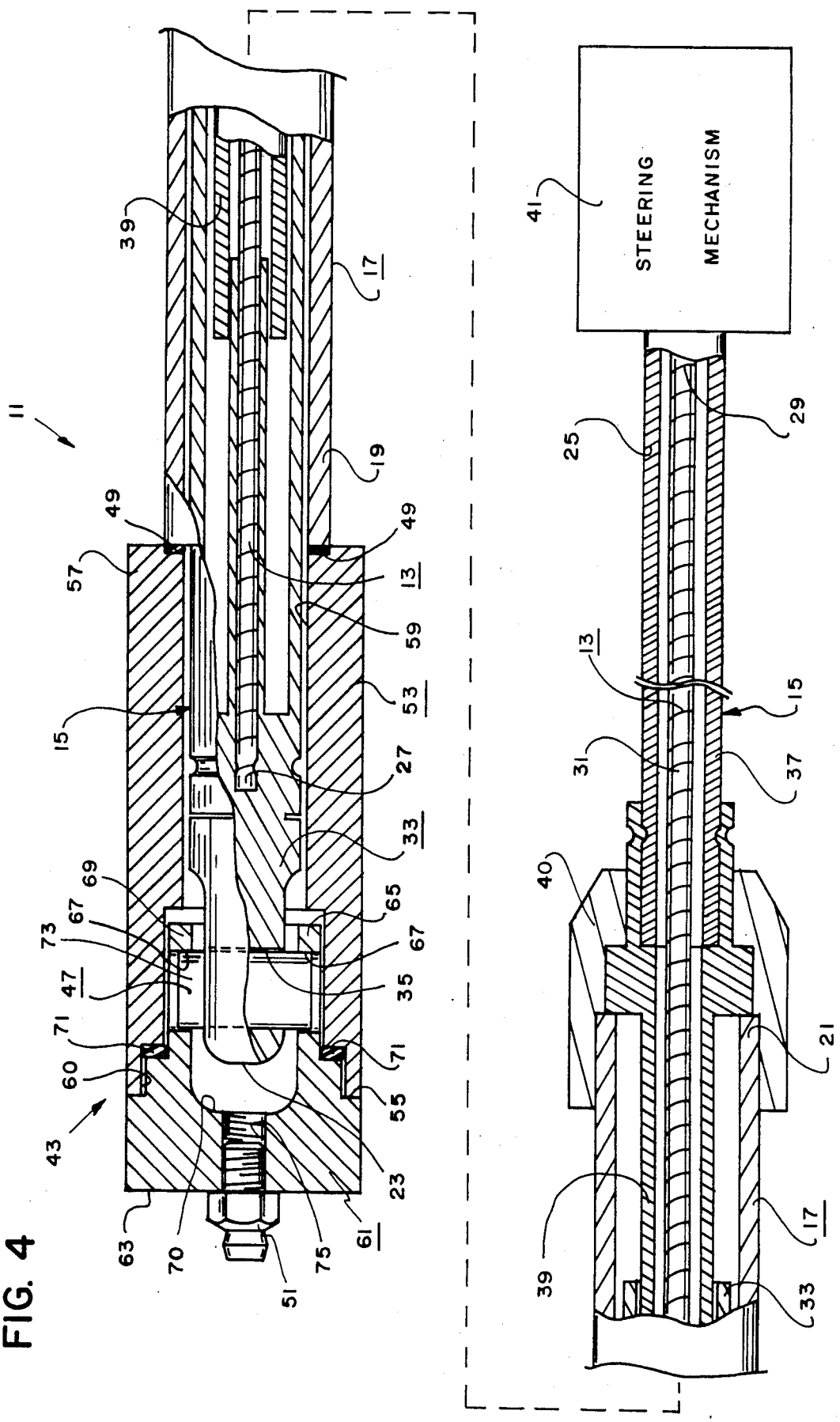
FIG. 4 is an enlarged sectional view thereof shown coupled to a cable means with portions thereof broken away for clarity.
Figure 5:
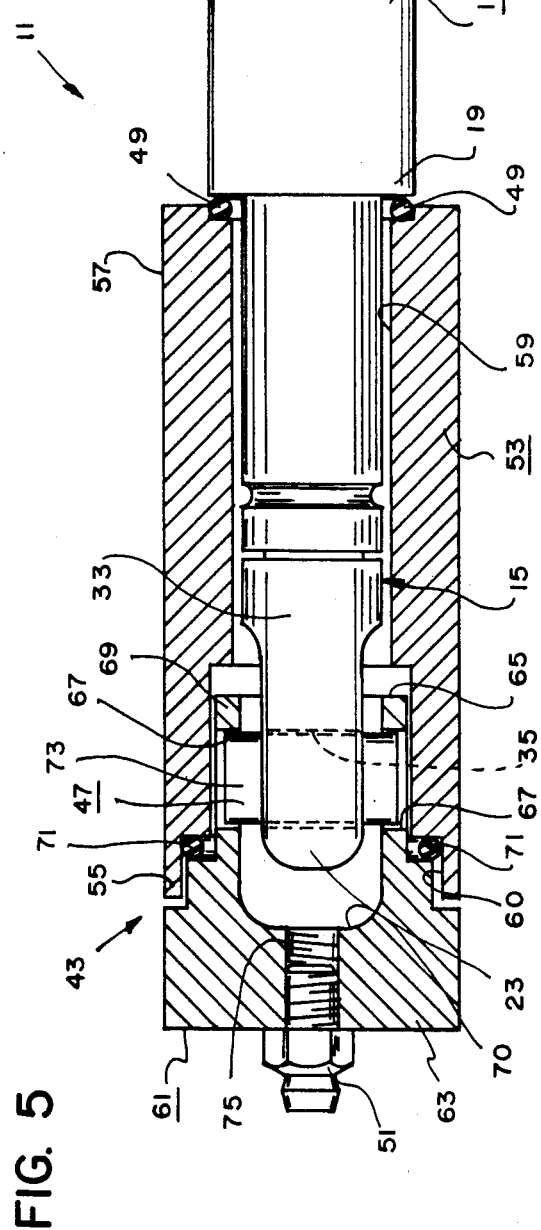
FIGS. 5 and 6 are enlarged sectional views thereof shown coupled to a cable means with the various elements thereof in moved positions.
Figure 6:
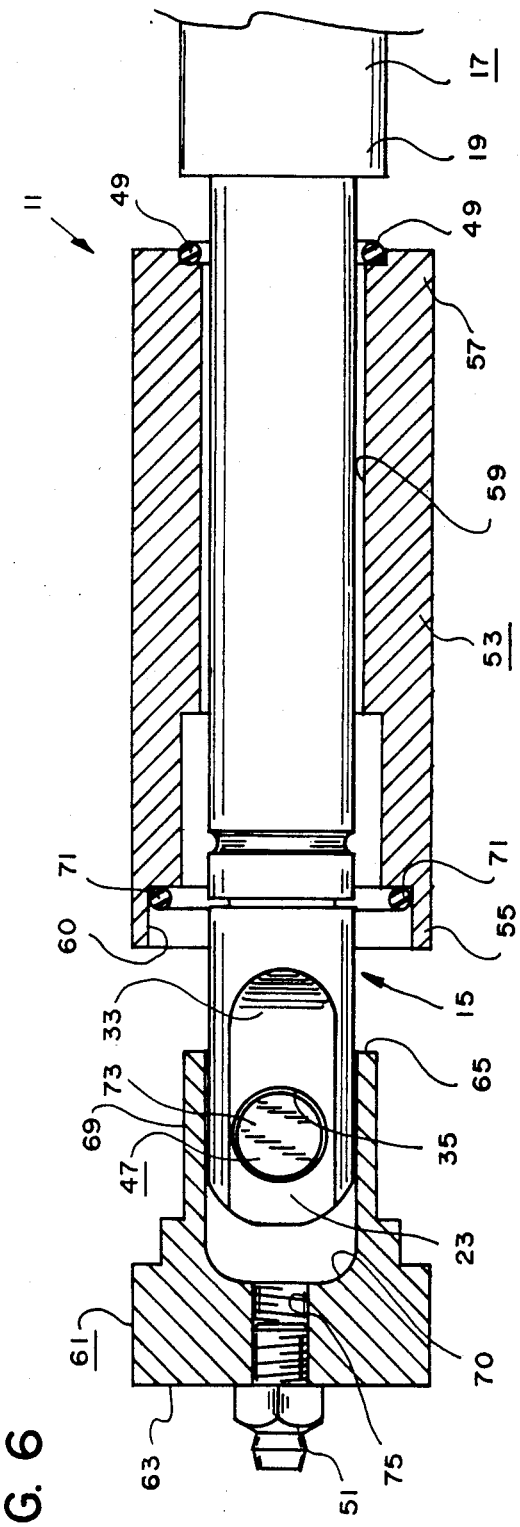

The inner cable lubricator device 11 of the present invention is for use in lubricating a cable or the like which extends coaxially through a tube or the like. Thus, for example, the device 11 allows the lubrication of an inner cable 13 of a cable means 15 of the type used in the steering of an outboard motor or the like as will be well known to those skilled in the art (see, in general, FIG. 4). Thus, the cable means 15 slidably extends coaxially through a tube 17 with the tube 17 having a first end 19 and a second end 21 (see FIGS. 4-6). The cable means 15 has a first end 23 located adjacent the first end 19 of the tube and has a second end 25 located adjacent the second end 21 of the tube 17. More specifically, the inner cable 13 has a first end 27, a second end 29 and a mid-portion 31. The cable means 15 includes a head member 33 attached (e.g., crimped) to the first end 27 of the inner cable 13. The head member 33 preferably has a transverse aperture 35 therethrough for reasons which will hereinafter become apparent. The head member 33 may be constructed of a plurality of components joined together to form an integral unit with the first end 27 of the inner cable 13 fixedly attached thereto. The cable means 15 may also include a sheath member 37 covering the mid-portion 31 of the inner cable 13 and a sleeve member 39 covering a portion of the inner cable 13 between the sheath member 37 and the first end 27 of the inner cable 13. The sheath member 37 may be attached (e.g., crimped) to the sleeve member 39 and a coupling means 40 is provided to secure and seal the second end 21 of the tube 17 relative to the sleeve member 39 as will be apparent to those skilled in the art. The second end 29 of the inner cable 13 is operatively coupled to a steering mechanism 41 or the like which can be operated to apply a force to the inner cable to pull the inner cable 13 and the head member 33 in a direction toward the second end 21 of the tube 17. The specific construction and operation of the cable means 15 and associated structure will be apparent to those skilled in the art and may vary as will be apparent to those skilled in the art.

The device 11 includes, in general, a body means 43 located adjacent the first end 19 of the tube 17 and having a cavity 45 therein for receiving the first end 23 of the cable means 15; an attachment means 47 coupled to the body means 43 for attaching the first end 23 of the cable means 15 to the body means 43; seal means 49 located between the first end 19 of the tube 17 and the body means 43 about the cavity 45 of the body means 43 for providing a seal between the first end 19 of the tube 17 and the body means 43 about the cavity 45 of the body means 43 when a force is applied to the cable means 15 (e.g., to the inner cable 13 by the steering mechanism 41) to pull the body means 43 against the first end 19 of the tube 17; and a grease fitting means 51 attached to the body means 43 in communication with the cavity 45 of the body means 43 for allowing grease to be forced therethrough into the cavity 45 of the body means 43 and into the interior of the tube 17 to lubricate the cable means 15 when a seal is provided between the first end 19 of the tube 17 and the body means 43 about the cavity 45 of the body means 43 (see, in general, FIGS. 1 and 3).

The body means 43 preferably includes a body member 53 having a first end 55, a second end 57 and an aperture 59 extending completely therethrough between the first and second ends 55, 57 thereof. The body member 53 preferably has an enlarged opening 60 in the first end 55 thereof about the aperture 59 for reasons which will hereinafter become apparent. The enlarged opening 60 preferably has a stepped-wall for reasons which will hereinafter become apparent. The first end of the cable means 15 (e.g., the head member 33) extends into or through the aperture 59. The body member 53 may be constructed in various manners out of various materials which will now be apparent to those skilled in the art, such as, for example, by being machined out of a metal such as aluminum or the like.

The body means 43 preferably includes a cap member 61 having a first end 63 and a second end 65. The second end 65 of the cap member 61 is located adjacent the first end 55 of the body member 53 for closing the aperture 59 of the body member 53 to define the cavity 45 of the body means 43. The attachment means 47 is coupled to the cap member 63 to attach the first end 23 of the cable means 15 (e.g., the head member 33) to the cap member 61. The cap member 61 preferably has a transverse aperture 67 through the second end 65 thereof for reasons which will hereinafter become appaent. The second end 65 of the cap member 61 preferably includes a boss portion 69 for fitting into the enlarged opening 60 of the body member 53. The boss portion 69 preferably has a stepped-wall for mating with the stepped-wall of the enlarged opening 60 of the body member 53. The cap member 61 preferably has a cavity 70 extending from the second end 65 thereof toward the first end 63 thereof for defining an extension of the aperture 59 of the body member 53 when the boss portion 69 is mated with the enlarged opening 60 and for receiving the first end 23 of the cable means 15 (e.g., the head member 33). The transverse aperture 67 preferably extends through the boss portion 69 and connects with the cavity 70 for reasons which will hereinafter become apparent. The cap member 61 may be constructed in various manners and of various material as will now be apparent to those skilled in the art, such as, for example, by being machined out of metal, such as aluminum or the like.

The device 11 preferably includes a seal means 71 located between the second end 65 of the cap member 61 and the first end 55 of the body member 53 about the aperture 59 and enlarged opening 60 of the body member 53 for providing a seal between the cap member 61 and the body member 53 about the aperture 59 and enlarged opening 60 of the body member 53 when the first end 23 of the cable means 15 (e.g., the head member 33) is attached to the cap member 61 and force is applied to the cable means 15 (e.g., to the inner cable 13 by steering mechanism 41) to pull the cap member 61 against the body member 53 as will now be apparent to those skilled in the art.

The seal means 49 may consist of a typical resilient O-ring positioned between the second end 57 of the body member 53 and the first end 19 of the tube 17 as will now be apparent to those skilled in the art. The seal means 71 may also consist of a typical resilient O-ring located between the stepped-wall of the boss portion 69 of the cap member 61 and the stepped-wall of the enlarged opening 60 of the body member 53. In addition to providing fluid-tight seals when force is applied to the cable means 15 to pull the device 11 against the tube 17, the seal means 49, 71 also act as pressure relief means if the pressure of grease being forced into the cavity 45 is above a certain amount due to the inherent characteristics of the resilient O-rings which will rupture if the pressure within the cavity 45 passes a certain amount thereby allowing grease to pass through the seal means 49, 71 thereby preventing damage to the cable means 15 due to high pressure.

The attachment means 47 preferably consists simply of a pin member 73 (see, in general, FIGS. 1 and 3) for extending through the transverse aperture 67 of the cap member 61 and through the transverse aperture 35 of the first end 23 of the cable means 15 (e.g., of the head member 33) for attaching the first end 23 of the cable means 15 (e.g., the head member 33) to the body means 43 (e.g., the cap member 61). The pin member 73 may be constructed in various manners and of various materials now apparent to those skilled in the art, such as, for example, by being machined out of metal or the like. The length of the pin member 73 is approximately the same as the diameter of the cap member 61 at the point where the transverse aperture 67 is provided to allow the pin member 73 to be located within the enlarged aperture 60 of the body member 53.

The grease fitting means 51 preferably consists simply of a typical screw-on type nipple or the like (see, in general, FIGS. 1 and 3) well known to those skilled in the art for coacting with a typical grease gun or the like to allow grease to be forced therethrough. Thus, the cap member 61 preferably has a threaded aperture 75 through the first end 63 thereof opening into the cavity 70 thereof for threadingly receiving the grease fitting means 51 to allow grease to be forced through the grease fitting means 51 into the cavity 70.

As thus constructed, the device 11 allows the inner cable 13 to be easily lubricated.

To use the device 11 with the specific cable means 15 hereabove disclosed, the first step is to detach the head member 33 of the cable means 15 from an outboard motor or the like by merely removing the pin or the like which extends through the transverse aperture 35 of the head member 33 to attach the head member 33 to the outboard motor or the like as will be apparent to those skilled in the art. The head member 33 is then inserted through the aperture 59 of the body member 53 and into the cavity 70 of the cap member 61 to align the transverse aperture 35 and the transverse aperture 67 (see FIGS. 5 and 6). The pin member 73 is then inserted through the transverse apertures 35, 67 to thereby attach the body means 43 to the cable means 15. Force is then applied to the inner cable 13 by way of the steering mechanism 41 or the like to pull the cap member 61 against the body member 53 and to pull the body member 53 against the first end 19 of the tube 17 thereby creating a fluid-tight seal between the body member 53 and the first end 19 of the tube 17 and between the cap member 61 and the first end 55 of the body member 53 by way of the seal means 49, 71 (see FIG. 4) as will now be apparent to those skilled in the art. Next, grease is merely forced through the grease fitting means 51 with a typical grease gun or the like (not shown) thereby allowing grease to be forced through the grease fitting means 51 into the cavity 45 of the body means 43 (i.e., into the cavity 70 of the cap member 61 and the aperture 59 of the body member 53), into the interior of the tube 17, between a portion of the head member 33 and the sleeve member 39 and/or inner cable 13, between the sleeve member 39 and the inner cable 13, and between the sheath member 37 and the inner cable 13 in a manner which will now be apparent to those skilled in the art thereby fully lubricating the inner cable 13.

Although the present invention has been described and illustrated with respect to a preferred embodiment thereof and a preferred use therefore, it is not to be so limited since changes and modification can be made therein which are within the full intended scope of the invention.

I claim:

1. A device for allowing the lubrication of a cable means which extends coaxially through a tube, said tube having a first end and a second end, said cable means having a first end located adjacent said first end of said tube and having a second end located adjacent said second end of said tube, said device comprising:

(a) body means located adjacent said first end of said tube and having a cavity for receiving said first end of said cable means;

(b) attachment means coupled to said body means for attaching said first end of said cable means to said body means;

(c) seal means located between said first end of said tube and said body means about said cavity of said body means for providing a seal between said first end of said tube and said body means about said cavity of said body means when said second end of said cable means is pulled to sandwich said seal means between said body means and said first end of said tube; and (d) grease fitting means attached to said body means in communication with said cavity of said body means for allowing grease to be forced therethrough into said cavity of said body means and into the interior of said tube to lubricate said cable means when said second end of said cable means is pulled to sandwich said seal means between said body means and said first end of said tube to cause said seal means to form a seal between said first end of said tube and said body means about said cavity of said body means.

2. The device of claim 1 in which said body means includes a body member having a first end and a second end and having an aperture extending completely therethrough between said first and second ends thereof, said first end of said cable means extending through said aperture of said body member.

3. The device of claim 2 in which said body means includes a cap member having a first end and a second end, said second end of said cap member being located adjacent said first end of said body member for closing said aperture of said body member and for coacting with said aperture of said body member to define said cavity of said body means, said attachment means being coupled to said cap member to attach said first end of said cable means to said cap member.

4. The device of claim 3 in which is included a seal means located between said second end of said cap member and said first end of said body member about said aperture through said body member for providing a seal between said cap member and said body member about said aperture through said body member when said first end of said cable means is attached to said cap member and force is applied to said cable means to pull said cap member against said body member.

5. The device of claim 4 in which said first end of said cable means has a transverse aperture therethrough; in which said cap member has a transverse aperture through said second end thereof; and in which said attachment means includes a pin member extending through said transverse aperture of said cap member and said transverse aperture of said first end of said cable means for attaching said first end of said cable means to said cap member.

6. The device of claim 5 in which said second end of said cap member includes a boss portion; in which said body member has an enlarged opening in said first end thereof about said aperture therethrough for receiving said boss portion of said cap member.

7. The device of claim 6 in which said boss portion of said cap member includes a stepped-wall; in which said enlarged opening of said body member has a stepped-wall for mating with said stepped-wall of said cap member.

8. The device of claim 7 in which said seal means between said first end of said tube and said body means consist of an O-ring; and in which said seal means between said second end of said cap member and said first end of said body member consist of an O-ring located between said stepped-wall of said boss portion of said cap member and said stepped-wall of said enlarged opening of said body member.

9. A device for allowing the lubrication of an inner cable of a cable means which extends coaxially through a tube, said tube having a first end and a second end, said inner cable having first and second ends and a midportion, said cable means including a head member attached to said first end of said inner cable, said cable means including a sheath member covering said midportion of said inner cable, said second end of said tube being sealed to said sheath member, said device comprising:

(a) body means located adjacent said first end of said tube and having a cavity for receiving said head member of said cable means;

(b) attachment means coupled to said body means for attaching said head member of said cable means to said body means;

(c) seal means located between said first end of said tube and said body means about said cavity of said body means for forming a seal between said first end of said tube and said body means about said cavity of said body means when said second end of said inner cable is pulled to sandwich said seal means between said body means and said first end of said tube; and (d) grease fitting means attached to said body means in communication with said cavity of said body means for allowing grease to be forced therethrough into said cavity of said body means, into the interior of said tube, and between said sheath member and said inner cable when said second end of said inner cable is pulled to sandwich said seal means between said body means and said first end of said tube to cause said seal means to form a seal between said first end of said tube and said body means about said cavity of said body means.

* * * * *